E. KEMPSHALL.
TIRE.
APPLICATION FILED MAR. 30, 1908.

908,275.

Patented Dec. 29, 1908.

Witnesses
Hugh Cornwall
John Roby

Inventor
E. Kempshall
by Mr. Munie
Atty

UNITED STATES PATENT OFFICE.

ELEAZER KEMPSHALL, OF LONDON, ENGLAND.

TIRE.

No. 908,275.　　　　Specification of Letters Patent.　　　Patented Dec. 29, 1908.

Application filed March 30, 1908. Serial No. 424,216.

*To all whom it may concern:*

Be it known that I, ELEAZER KEMPSHALL, a citizen of the United States of America, and residing at Hotel Russell, Russell Square, London, W. C., England, have invented certain new and useful Improvements in Tires, of which the following is a specification.

This invention relates to non skid tires which are provided with circular recesses in the tread to act as suction chambers.

The object of the present invention is to retain the advantages of these recesses while avoiding weakening of the tire at the parts immediately below the recesses, and the invention consists essentially in forming conical dome-shaped or like protuberances on the bottom of the recesses, thereby considerably increasing the thickness of the tire at these portions while still leaving sufficient space in the recesses to enable the latter to act efficiently as suction chambers.

Figure 1:
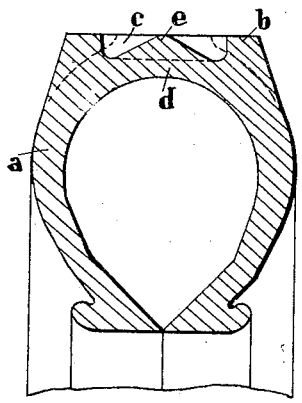
Figure 3:
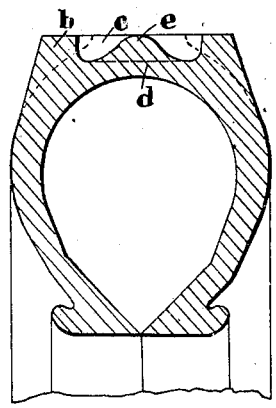
Figure 2:
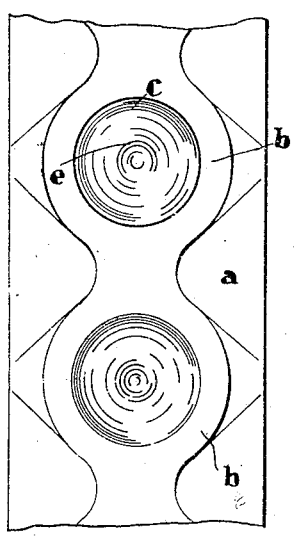
Figure 4:
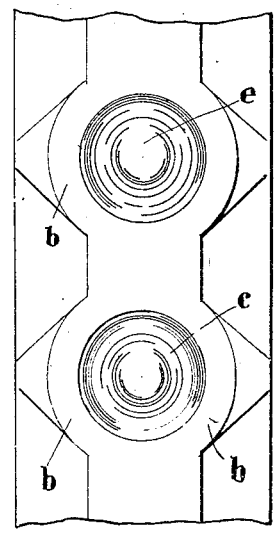
Figure 5:
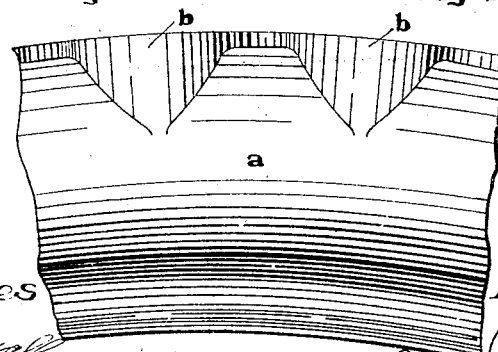

In the accompanying drawings Figures 1 and 2 are respectively a cross section and a plan of a portion of a tire according to one form of the invention, Figs. 3 and 4 being similar views of a portion of a tire according to another form. Fig. 5 is a side elevation corresponding to Fig. 4.

In carrying out the invention according to one mode a pneumatic tire, $a$, is provided with projecting studs, $b$, of approximately circular form and merging into one another so as to form a continuous tread and one the plane of which is practically flat when in contact with the road. Each stud, $b$, is formed with a circular recess, $c$, which acts as a suction chamber when the stud is in contact with the road surface and avoids side slip or skidding. If the recesses were formed with flat bottoms the thickness of the tire at the portions, $d$, is so reduced as to render the tire weak at these parts. In order to adequately strengthen these portions and yet to retain sufficient space in the recesses so as not to reduce the efficiency of the recesses when acting as suction chambers, a protuberance $e$ is formed in each recess. The protuberance also aids the ejection of mud. This protuberance may be of conical form as in Figs. 1 and 2, of dome shape as in Figs. 3 and 4 or of any other similar shape. The protuberances $e$ may be molded integral with the tire. Their apexes are preferably flush with the tread but they may be lower than the latter.

Having thus described my invention what I claim as new and desire to secure by Letters Patent is:—

1. A tire having a body portion provided on its tread with a rib formed with a series of recesses, the face of the tread between the edges of the recesses and the edges of the ribs being substantially flat to resist downward pressure of the tire, the outer walls of the rib being of irregular formation and the walls of the recesses being substantially parallel, the bottoms of the recesses having projections formed with the body portion to reinforce said body portion of the tire at the points where the recesses are formed.

2. A tire having a body portion provided with a rib on its tread, said rib having recesses some distance from the edge of the rib to provide a substantially flat tread surface said rib being narrower than the body portion, the bottoms of the recesses having projections formed with the body portion and extending to a point on a line with the upper edges of the ribs the outer faces of the projections being rounded, and their bottoms being rounded to merge into the body portion.

3. A tire having a body portion formed with a narrow rib, the outer walls of the rib having projections which taper to the body portion, the walls of the portion of the rib between the projecting portions being straight, said projecting portions of the rib having recesses therein the walls of the recesses being parallel, and projections in the bottom of the recesses, said projections reinforcing the body portion of the tire at the points where the recesses are formed.

In testimony whereof I have signed my name to this specification in the presence of two subscribing witnesses.

ELEAZER KEMPSHALL.

Witnesses:
A. W. MATHYS,
ALBERT E. PARKER.